United States Patent
VerSteeg

(10) Patent No.: US 9,058,167 B2
(45) Date of Patent: Jun. 16, 2015

(54) POWER CONSERVATION IN A DISTRIBUTED DIGITAL VIDEO RECORDER/CONTENT DELIVERY NETWORK SYSTEM

(75) Inventor: William C. VerSteeg, Buford, GA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 538 days.

(21) Appl. No.: 13/226,326

(22) Filed: Sep. 6, 2011

(65) Prior Publication Data

US 2013/0061076 A1    Mar. 7, 2013

(51) Int. Cl.
| | |
|---|---|
| G06F 1/32 | (2006.01) |
| H04L 12/12 | (2006.01) |
| H04N 21/222 | (2011.01) |
| H04N 21/231 | (2011.01) |
| H04N 21/433 | (2011.01) |
| H04N 21/443 | (2011.01) |
| H04N 21/6543 | (2011.01) |

(52) U.S. Cl.
CPC ............ *G06F 1/3209* (2013.01); *G06F 1/3268* (2013.01); *Y02B 60/1246* (2013.01); *Y02B 60/32* (2013.01); *H04L 12/12* (2013.01); *H04N 21/222* (2013.01); *H04N 21/23106* (2013.01); *H04N 21/4334* (2013.01); *H04N 21/4436* (2013.01); *H04N 21/6543* (2013.01); *Y02B 60/34* (2013.01)

(58) Field of Classification Search
None
See application file for complete search history.

(56) References Cited

U.S. PATENT DOCUMENTS

| | | |
|---|---|---|
| 4,785,927 A | 11/1988 | Dobbins |
| 6,269,343 B1 | 7/2001 | Pallakoff |
| 6,415,270 B1 | 7/2002 | Rackson et al. |
| 6,618,709 B1 | 9/2003 | Sneeringer |
| 6,681,156 B1 | 1/2004 | Weiss |
| 6,686,709 B2 | 2/2004 | Lee et al. |
| 6,785,592 B1 | 8/2004 | Smith et al. |
| 6,930,947 B2 | 8/2005 | Chen |
| 6,980,526 B2 | 12/2005 | Jang et al. |
| 7,084,752 B2 | 8/2006 | Parello et al. |
| 7,177,728 B2 | 2/2007 | Gardner |
| 7,188,260 B1 | 3/2007 | Shaffer et al. |
| 7,203,849 B2 | 4/2007 | Dove |
| 7,263,450 B2 | 8/2007 | Hunter |

(Continued)

FOREIGN PATENT DOCUMENTS

WO    WO2013/025267    2/2013

OTHER PUBLICATIONS

Jetzt, et al., LLDP/LLDP-MED Proposal for PoE Plus,; PoE Plus Task Force, Sep. 15, 2006, Knoxville, TN; 15 pages.

(Continued)

*Primary Examiner* — Paul Yanchus, III
(74) *Attorney, Agent, or Firm* — Patent Capital Group

(57) ABSTRACT

A method is provided in one example embodiment and includes determining that a network storage module has resources for buffering data currently being sent to a local storage module; determining if the local storage module should enter into a power saving mode; and buffering the configurable amount of data at the network storage module while the local storage module is in the power saving mode. In more particular embodiments, the method includes communicating the configurable amount of data to the local storage module after it resumes a normal operating mode. In addition, the method may include communicating at least a portion of the configurable amount of data to the local storage module using a unicast protocol or a multicast protocol.

20 Claims, 8 Drawing Sheets

(56) References Cited

U.S. PATENT DOCUMENTS

| | | | |
|---|---|---|---|
| 7,324,518 B2 | 1/2008 | Dai et al. | |
| 7,337,336 B2 | 2/2008 | Ferentz et al. | |
| 7,366,933 B1 | 4/2008 | Aharonian et al. | |
| 7,392,407 B2 | 6/2008 | Jonnala et al. | |
| 7,698,580 B2 | 4/2010 | Schindler et al. | |
| 7,734,572 B2 | 6/2010 | Wiemeyer et al. | |
| 7,908,501 B2 | 3/2011 | Kim et al. | |
| 7,921,306 B2 | 4/2011 | Dove | |
| 7,941,677 B2 | 5/2011 | Penning | |
| 7,966,502 B2 | 6/2011 | Diab et al. | |
| 7,974,298 B2 | 7/2011 | Baird et al. | |
| 8,160,753 B2 | 4/2012 | Ferentz et al. | |
| 8,225,124 B2 | 7/2012 | Geiger et al. | |
| 8,250,381 B2 | 8/2012 | Hansalia et al. | |
| 8,261,104 B2 | 9/2012 | Landry et al. | |
| 8,301,918 B2 | 10/2012 | Diab et al. | |
| 8,352,754 B2 | 1/2013 | Chin | |
| 8,352,769 B1 | 1/2013 | Ghose et al. | |
| 8,407,332 B1 | 3/2013 | Kralpak et al. | |
| 2002/0016639 A1 | 2/2002 | Smith et al. | |
| 2002/0040475 A1 | 4/2002 | Yap et al. | |
| 2002/0157030 A1 | 10/2002 | Barker et al. | |
| 2003/0052180 A1 | 3/2003 | Huhn et al. | |
| 2003/0120959 A1 | 6/2003 | Bohrer | |
| 2004/0148388 A1 | 7/2004 | Chung et al. | |
| 2005/0055589 A1 | 3/2005 | Kojo | |
| 2005/0123109 A1 | 6/2005 | Yamagishi et al. | |
| 2005/0243861 A1 | 11/2005 | Elkayam et al. | |
| 2006/0053324 A1 | 3/2006 | Giat et al. | |
| 2006/0056397 A1 | 3/2006 | Aizu et al. | |
| 2006/0072531 A1 | 4/2006 | Ewing et al. | |
| 2007/0014268 A1* | 1/2007 | Kim et al. | 370/338 |
| 2007/0024239 A1 | 2/2007 | Park | |
| 2007/0043477 A1 | 2/2007 | Ehlers et al. | |
| 2007/0050818 A1 | 3/2007 | Berger et al. | |
| 2007/0135086 A1 | 6/2007 | Stanford | |
| 2007/0143637 A1 | 6/2007 | Tsai | |
| 2007/0189257 A1 | 8/2007 | Suzuki et al. | |
| 2007/0214473 A1 | 9/2007 | Barton et al. | |
| 2007/0276547 A1 | 11/2007 | Miller | |
| 2008/0001584 A1 | 1/2008 | Chen | |
| 2008/0037999 A1 | 2/2008 | Masuda | |
| 2008/0052546 A1 | 2/2008 | Schindler et al. | |
| 2008/0063381 A1 | 3/2008 | Conroy et al. | |
| 2008/0168283 A1 | 7/2008 | Penning | |
| 2008/0178232 A1* | 7/2008 | Velusamy | 725/88 |
| 2008/0215899 A1 | 9/2008 | Jonnala et al. | |
| 2008/0215902 A1 | 9/2008 | Jonnala et al. | |
| 2008/0225841 A1 | 9/2008 | Conway et al. | |
| 2008/0244282 A1 | 10/2008 | Hansalia et al. | |
| 2008/0256371 A1 | 10/2008 | Diab et al. | |
| 2008/0272741 A1 | 11/2008 | Kanamori | |
| 2008/0301322 A1 | 12/2008 | Horibe | |
| 2008/0303486 A1 | 12/2008 | Kao | |
| 2009/0049315 A1 | 2/2009 | Diab et al. | |
| 2009/0070603 A1 | 3/2009 | Diab et al. | |
| 2009/0083167 A1 | 3/2009 | Subbloie | |
| 2009/0182834 A1 | 7/2009 | Zettler et al. | |
| 2009/0195349 A1 | 8/2009 | Frader-Thompson | |
| 2009/0196281 A1 | 8/2009 | Kouchri | |
| 2009/0217063 A1 | 8/2009 | Tomita | |
| 2009/0217188 A1 | 8/2009 | Alexander et al. | |
| 2009/0228723 A1 | 9/2009 | Yoshizaki | |
| 2009/0229288 A1 | 9/2009 | Alston et al. | |
| 2009/0249091 A1 | 10/2009 | Goodnow | |
| 2009/0263127 A1* | 10/2009 | Haran et al. | 398/38 |
| 2009/0282277 A1 | 11/2009 | Sedarat et al. | |
| 2009/0310607 A1 | 12/2009 | Evans | |
| 2010/0052421 A1 | 3/2010 | Schindler et al. | |
| 2010/0070217 A1 | 3/2010 | Shimada et al. | |
| 2010/0080111 A1 | 4/2010 | Diab et al. | |
| 2010/0111523 A1* | 5/2010 | Hirth et al. | 398/25 |
| 2010/0145542 A1 | 6/2010 | Chapel et al. | |
| 2010/0162294 A1 | 6/2010 | Yin et al. | |
| 2010/0162305 A1 | 6/2010 | Downey et al. | |
| 2010/0172628 A1 | 7/2010 | Berger et al. | |
| 2010/0205466 A1 | 8/2010 | Diab et al. | |
| 2010/0235868 A1 | 9/2010 | Howarter et al. | |
| 2010/0241880 A1* | 9/2010 | Wertheimer et al. | 713/310 |
| 2010/0247068 A1 | 9/2010 | Howarter et al. | |
| 2010/0309904 A1 | 12/2010 | Couse | |
| 2010/0322078 A1 | 12/2010 | Wang et al. | |
| 2010/0329108 A1 | 12/2010 | Diab et al. | |
| 2011/0022699 A1 | 1/2011 | Powell et al. | |
| 2011/0029796 A1 | 2/2011 | Matthews et al. | |
| 2011/0067048 A1 | 3/2011 | Barton et al. | |
| 2011/0072286 A1 | 3/2011 | Graham | |
| 2011/0125337 A1 | 5/2011 | Zavadsky | |
| 2011/0131428 A1 | 6/2011 | Diab et al. | |
| 2011/0131438 A1 | 6/2011 | Levitan | |
| 2011/0157939 A1 | 6/2011 | Wang | |
| 2011/0191608 A1 | 8/2011 | Vetteth | |
| 2011/0199046 A1 | 8/2011 | Tsai | |
| 2011/0239019 A1 | 9/2011 | Johnston | |
| 2011/0246797 A1 | 10/2011 | Diab et al. | |
| 2011/0320833 A1 | 12/2011 | R. et al. | |
| 2012/0045210 A1* | 2/2012 | Kim et al. | 398/66 |
| 2012/0091804 A1 | 4/2012 | Altonen et al. | |
| 2012/0095610 A1 | 4/2012 | Chapel et al. | |
| 2012/0120958 A1 | 5/2012 | Mahadevan et al. | |
| 2012/0131369 A1 | 5/2012 | Paljug | |
| 2012/0226918 A1 | 9/2012 | Rallo | |
| 2012/0233478 A1 | 9/2012 | Mucignat et al. | |
| 2012/0259474 A1 | 10/2012 | Razum et al. | |
| 2012/0284537 A1 | 11/2012 | Kruglick | |
| 2013/0043730 A1 | 2/2013 | Claise et al. | |
| 2013/0132745 A1 | 5/2013 | Schoening et al. | |
| 2013/0158729 A1 | 6/2013 | Ghose et al. | |
| 2013/0303202 A1 | 11/2013 | Jafarian et al. | |
| 2013/0332001 A1 | 12/2013 | Parello et al. | |

OTHER PUBLICATIONS

Nordman, Bruce, "Energy Efficient Ethernet: Outstanding Questions," Mar. 12, 2007; 3 pages http://grouper.ieee.org/groups/802/3/eee_study/public/mar07/nordman2_01_0307.pdf.

Nordman, Bruce, et al., "Energy Efficiency and Regulation," IEEE 802 Tutorial;Jul. 13, 2009; 58 pages.

"Cisco Energywise"; Cisco Systems; Feb. 1, 2009; archived from http://www.archive.org; pp. 1-6.

"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Data Terminal Equipment (DTE) Power via Media Dependent Interface (MDI)," © 2003 IEEE, Jun. 18, 2003, 121 pages.

PCT Sep. 5, 2012 International Search Report and Written Opinion from International Application Serial No. PCT/US12/37359 10 pages.

Battery University, "How to Prolong Lithium-based Batteries," © 2011 Isidor Buchmann, 15 pages; http://www.batteryuniversity.com/parttwo-34.htm.

"Wake on Local Area Network (LAN)," EnergyStar Products, Energy Star; [printed on Nov. 16, 2011]; 4 pages http://www.energystar.gov/index.cfm?c=power_mgt.pr_power_mgt_wol.

Bennett, Mike, "IEEE 802.3az Energy Efficient Ethernet," Task Force Update, Presented to the P802.3ba Task Force, Denver, CO; Jul. 16, 2008; 17 pages http://www.ieee802.org/3/az/public/jul08/bennett_03_0708.pdf.

Claise, Benoit, et al., "Energy Management (eman): Description of Working Group," retrieved and printed on Aug. 17, 2011, 3 pages; http://datatracker.ietf.org/wg/eman/charter/.

Haran, Onn, "Applicability of EEE to Fiber PHYs," IEEE 8.02.3 EEE Meeting; Sep. 2007, Seoul, Korea; http://www.ieee802.org/3/eee_study/public/sep07/haran_1_0907.pdf; 12 pages.

SMART Board™, "Interactive Whiteboard," Sep. 2005; © 2005 SMART Technologies, Inc.; 2 pages.

Wertheimer, Aviad and Eric Mann, "Active/Idle Toggling with Low-Power Idle," IEEE 802.3az Jan. 2008 Interim Meeting; 15 pages.

(56) References Cited

OTHER PUBLICATIONS

Wertheimer, et al., "Capabilities Negotiation Proposal for Energy-Efficient Ethernet," IEEE 802.3az, May 2008, pp. 1-18.
PCT Feb. 18, 2014 International Preliminary Report on Patentability from International Application Serial No. PCT/US12/37359 7 pages.
U.S. Appl. No. 12/368,124, filed Feb. 9, 2009, entitled "System and Method for Intelligent Energy Management in a Network Environment," Inventor(s): Tirthankar Ghose et al.
USPTO Jun. 23, 2011 Nonfinal Office Action from U.S. Appl. No. 12/368,124.
USPTO Nov. 10, 2011 Final Office Action from U.S. Appl. No. 12/368,124.
USPTO Aug. 22, 2012 Non-Final Office Action from U.S. Appl. No. 12/368,124.
USPTO Jan. 16, 2013 Final Office Action from U.S. Appl. No. 12/368,124.
USPTO May 3, 2013 Non-Final Office Action from U.S. Appl. No. 12/368,124.
USPTO Sep. 11, 2013 Final Office Action from U.S. Appl. No. 12/368,124.
USPTO Jan. 8, 2014 Notice of Allowance from U.S. Appl. No. 12/368,124.
USPTO Jun. 28, 2011 Nonfinal Office Action from U.S. Appl. No. 12/368,154.
USPTO Nov. 18, 2011—Final Office Action from U.S. Appl. No. 12/368,154.
USPTO Mar. 28, 2012 Notice of Allowance from U.S. Appl. No. 12/368,154.
USPTO Jul. 17, 2012 Second Notice of Allowance from U.S. Appl. No. 12/368,154.
USPTO Oct. 26, 2012 Third Notice of Allowance from U.S. Appl. No. 12/368,154.
USPTO Sep. 18, 2013 Non-Final Office Action from U.S. Appl. No. 13/736,035.
USPTO Jan. 27, 2014 Notice of Allowance from U.S. Appl. No. 13/736,035.
USPTO May 24, 2012 Non Final Office Action from U.S. Appl. No. 12/700,175.
USPTO Oct. 5, 2012 Final Office Action from U.S. Appl. No. 12/700,175.
USPTO Feb. 27, 2014 Non-Final Office Action from U.S. Appl. No. 12/700,175.
USPTO Jun. 20, 2012 Non-Final Office Action from U.S. Appl. No. 12/826,416.
USPTO Oct. 25, 2012 Final Office Action from U.S. Appl. No. 12/826,416.
USPTO Mar. 20, 2013 Non-final Office Action from U.S. Appl. No. 12/826,416.
USPTO Aug. 9, 2013 Final Office Action from U.S. Appl. No. 12/826,416.
USPTO Feb. 10, 2014 Non-Final Office Action from U.S. Appl. No. 12/826,416.
USPTO Jul. 5, 2013 Non-Final Office Action from U.S. Appl. No. 13/302,544.
USPTO Oct. 25, 2013 Final Office Action from U.S. Appl. No. 13/302,544.
USPTO Feb. 6, 2014 Non-Final Office Action from U.S. Appl. No. 13/302,544.
USPTO Nov. 21, 2014 Notice of Allowance from U.S. Appl. No. 12/700,175.
USPTO Dec. 23, 2014 Non-Final Office Action from U.S. Appl. No. 13/302,544.
"Data Link Layer," Wikipedia, Jun. 28, 2014, 7 pages http://en.wikipedia.org/wiki/Data_link_layer.
"Link Layer Discovery Protocol," Wikipedia, Mar. 28, 2014, 4 pages http://en.wikipedia.org/wiki/Link_Layer_Discovery_Protocol.
USPTO May 22, 2014 Non-Final Office Action from U.S. Appl. No. 13/302,544.
USPTO Jun. 2, 2014 Notice of Allowance from U.S. Appl. No. 13/211,798.
USPTO Jul. 25, 2014 Final Office Action from U.S. Appl. No. 12/700,175.
USPTO Aug. 28, 2014 Final Office Action from U.S. Appl. No. 13/302,544.
USPTO Sep. 9, 2014 Final Office Action from U.S. Appl. No. 12/826,416.
USPTO Nov. 10, 2014 Non-Final Office Action from U.S. Appl. No. 13/492,617.
"MAC Address Definition," The Linux Information Project, Sep. 15, 2005 http://www.info.org.mac_address.html.
USPTO Jan. 20, 2015 Notice of Allowance from U.S. Appl. No. 12/826,416.
USPTO Feb. 27, 2015 Final Office Action from U.S. Appl. No. 13/492,617.
USPTO Mar. 31, 2015 Final Office Action from U.S. Appl. No. 13/302,544.

* cited by examiner

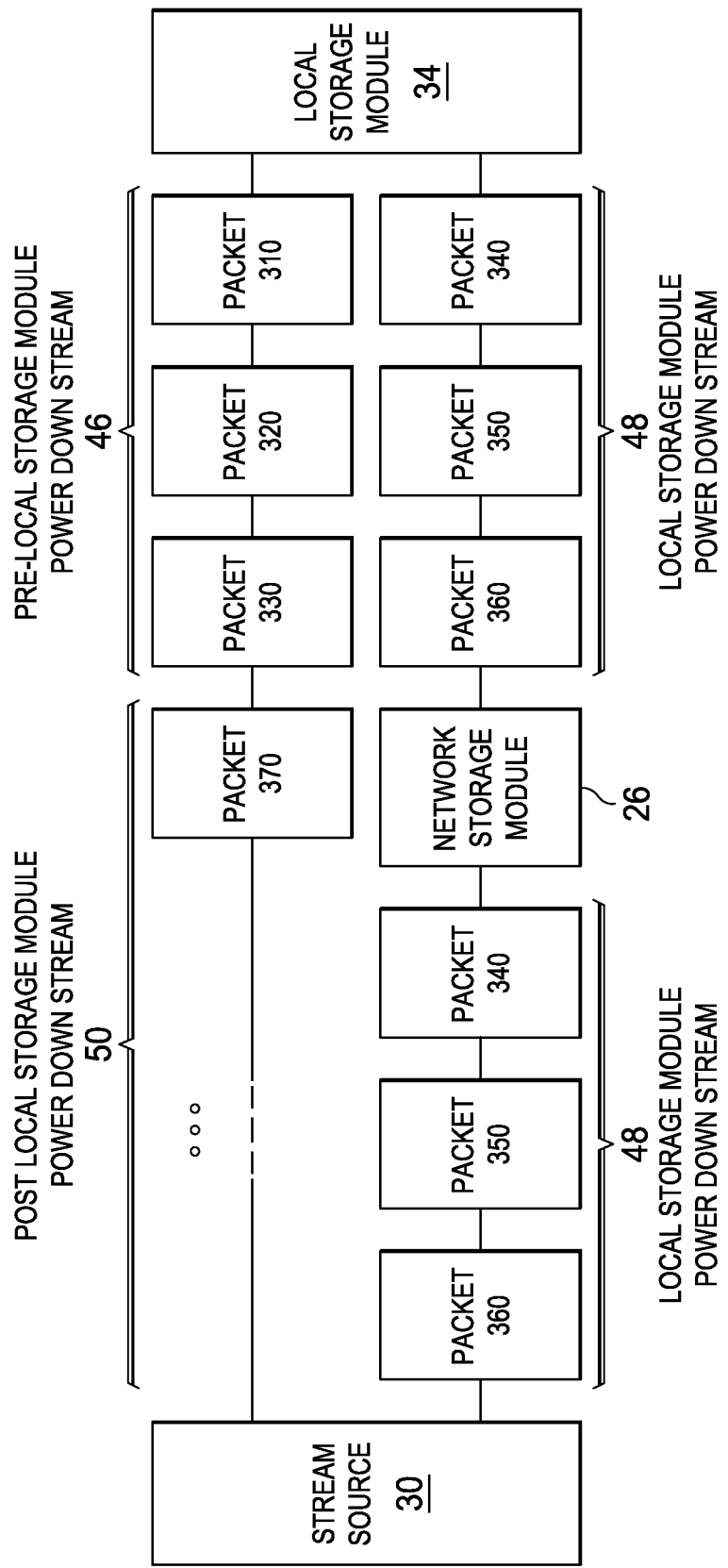

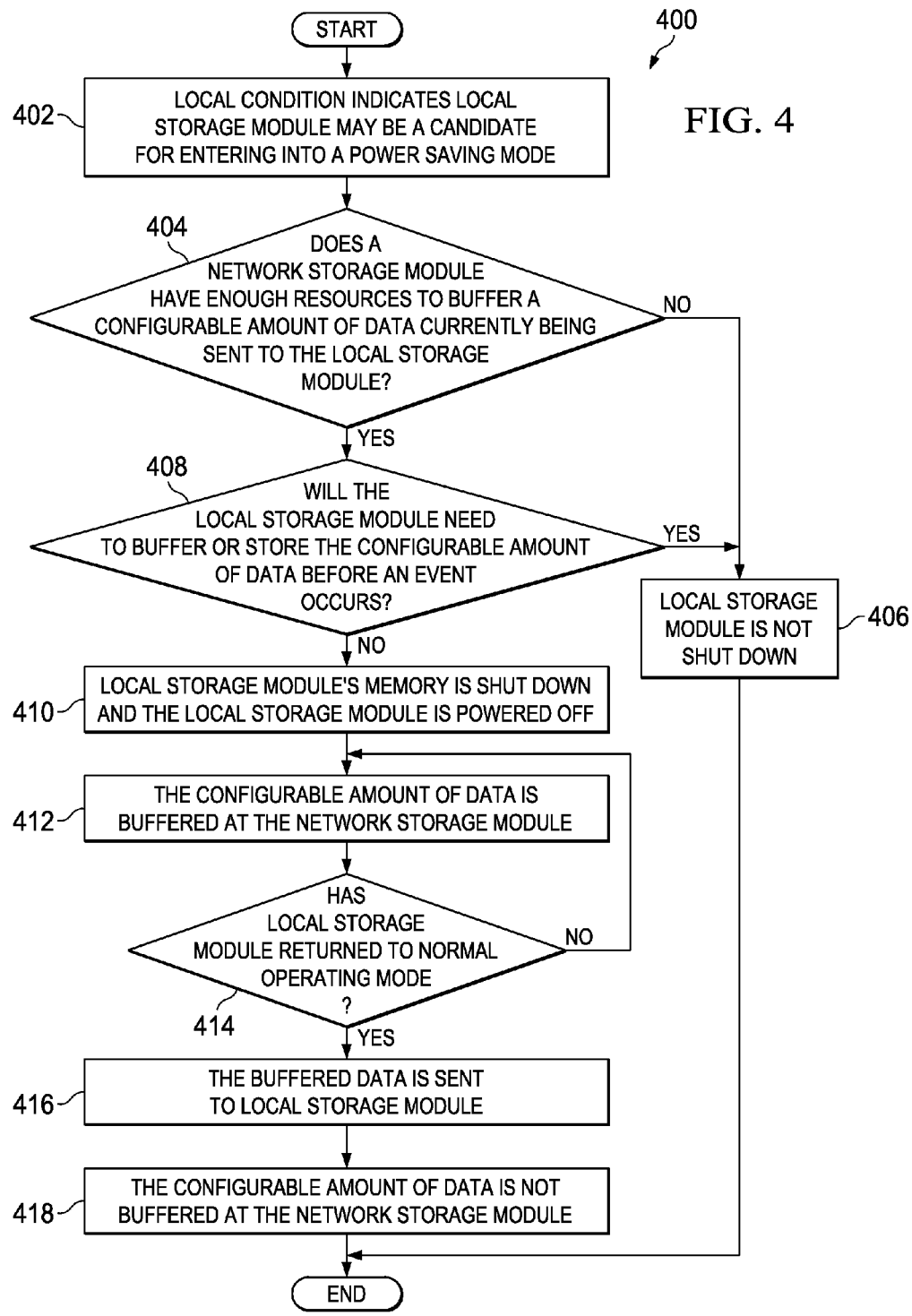

POWER CONSERVATION IN A DISTRIBUTED DIGITAL VIDEO RECORDER/CONTENT DELIVERY NETWORK SYSTEM

TECHNICAL FIELD

This disclosure relates in general to the field of energy and, more particularly, to power conservation in a distributed digital video recorder/content delivery network system.

BACKGROUND

Energy consumption has become a preeminent concern for industrialized societies. Both consumers and businesses have become aware of their energy usage. Whether motivated by altruistic reasons, or by profitability concerns, individuals have come to terms with the notion that energy is a finite commodity: a commodity having accompanying costs that should be managed. Administrators now focus on power usage and, more specifically, on how to reduce those expenditures. In recent times, device manufacturers have added instrumentation and features in the network to quell these concerns. However, as network systems have become more sophisticated and energy demands have continued to increase, a significant challenge lies in matching network capabilities with more intelligent energy consumption.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified flow diagram illustrating potential operations associated with one embodiment of the present disclosure.

DETAILED DESCRIPTION OF EXAMPLE EMBODIMENTS

Overview

A method is provided in one example embodiment and includes determining that a network storage module has resources for buffering data currently being sent to a local storage module. The data can be associated with video, multimedia information, audio, etc. The method also includes determining if the local storage module should enter into a power saving mode; and buffering the configurable amount of data at the network storage module while the local storage module is in the power saving mode. In more particular embodiments, the method can include communicating the configurable amount of data to the local storage module after it resumes a normal operating mode. In addition, the method may include communicating at least a portion of the configurable amount of data to the local storage module using a unicast protocol or a multicast protocol.

In specific implementations, the local storage module is provided in a digital video recorder, which resumes a normal operating mode after a predetermined time interval. Additionally, historical data of past use of the local storage module can be used to determine if the local storage module should enter into the power saving mode. A particular type of content can be evaluated as a basis for determining whether to initiate the buffering of the configurable amount of data. In certain instances, at least a portion of the configurable amount of data is cached and presented at a requested playout position, which can be identified in a request for the portion.

Example Embodiments

Figure 1:
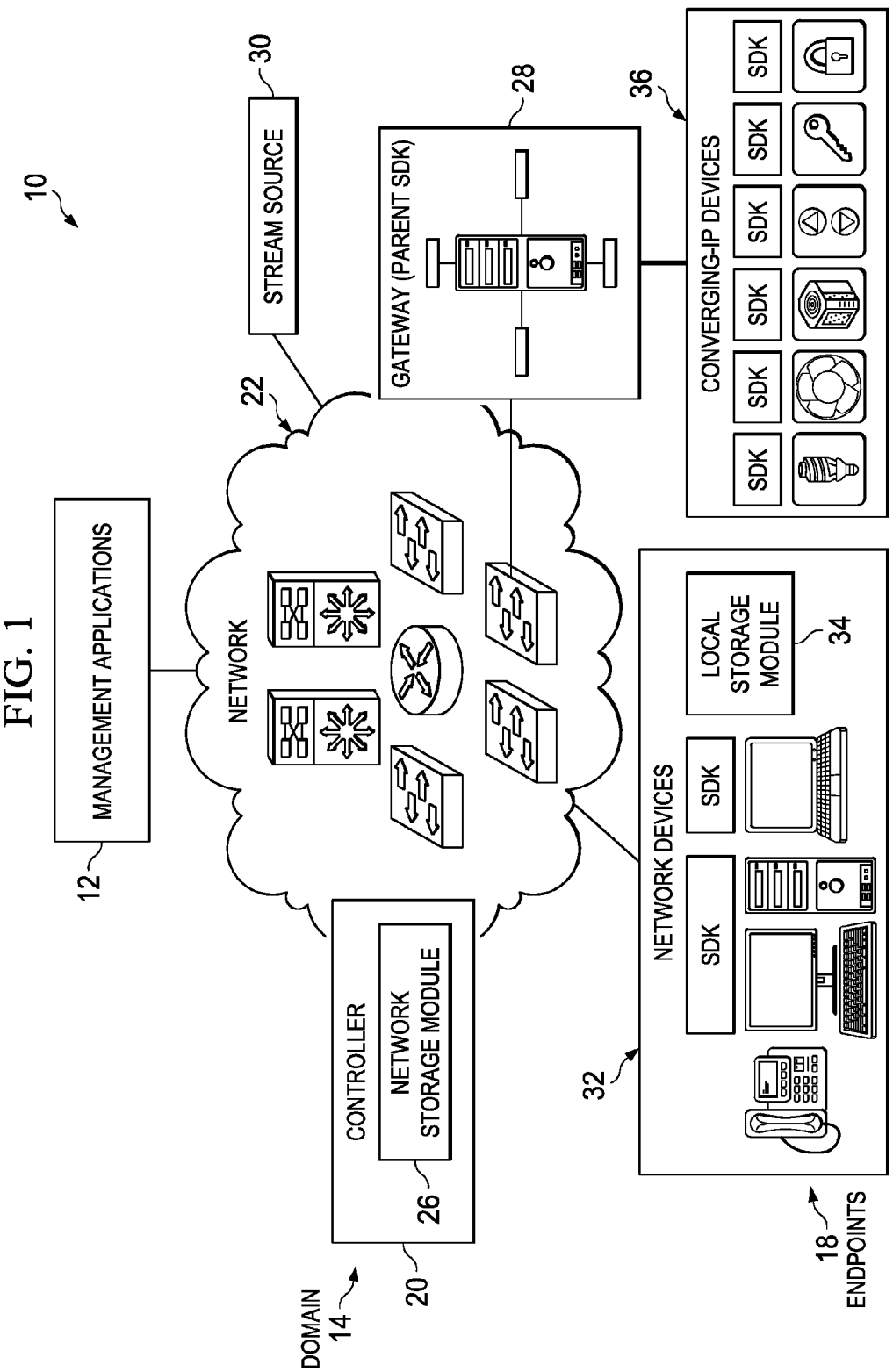
FIG. 1 is a simplified block diagram of an energy management system in accordance with one embodiment of the present disclosure.

FIG. 1 is a simplified block diagram of an energy management system 10 in accordance with one example implementation of the present disclosure. FIG. 1 includes a domain 14 that can include any number of devices such as wireless controllers, access points (APs), routers, switches, etc., which can be part of a network 22. Domain 14 is also coupled to a set of power management applications 12, which may include elements such as a local area network (LAN) management element. Management applications 12 can operate to intelligently control (directly or indirectly) any of a plurality of endpoints 18 being depicted in FIG. 1. A controller 20 can be provisioned in network 22 in order to execute some of the power management activities discussed herein. Controller 20 may include a network storage module 26, which can interface with a plurality of network devices 32 such as a local storage module 34. In a particular embodiment, local storage module 34 is a digital video recorder (DVD). Additionally, a gateway 28 may be provisioned in network 22 such that it can interface with a plurality of converging-IP devices 36, as is being illustrated in FIG. 1. In one particular implementation, any of the infrastructure of domain 14 can interact with a number of endpoints 18 (e.g., local storage module 34, personal computers (PCs), building controllers, wireless devices, telephones, lighting fixtures, HVAC systems, video devices (e.g., Telepresence systems), etc.).

As shown in FIG. 1, a stream source 30 may be in communication with network 22. Stream source 30 can provide a data or program stream to network 22. For ease of illustration and explanation, stream source 30 is shown in FIG. 1 as producing a single program stream. However, it should be understood that stream source 30 typically generates multiple data (or program) streams that are delivered to multiple subscribers (e.g., multiple local storage modules 34).

In accordance with the teachings of the present disclosure, energy management system 10 can be configured to command and control functions for any number of endpoints 18. Note that regardless of whether local storage module 34 is turned on or off, it typically buffers a configurable amount of data (e.g., 30 minutes of content) from a currently tuned channel such that a user can rewind and watch the buffered data (if so desired). In one embodiment, the configurable amount can be set by an administrator or an end user, where the data is a media channel. For example, the configurable amount may be set to buffer 15 minutes, 30 minutes, or 45 minutes of a current television channel being delivered to local storage module 34. Because local storage module 34 is consistently buffering the configurable amount of data, local storage module 34 is unable to go into a power saving mode; this is not energy efficient, and this shortens the life of the disk drives in local storage module 34.

In a particular embodiment of the present disclosure, network storage module 26 determines if it has enough capacity to buffer a configurable amount of data from a currently tuned channel on local storage module 34. If network storage module 26 determines that there is enough bandwidth/CPU/disk capacity to buffer the configurable amount of data, (i.e., to satisfy a potential future rewind request) network storage module 26 sends a signal to local storage module 34 to not buffer the configurable amount of data and to enter into a power saving mode (i.e., any type of energy or power reduction mode inclusive of hibernating activities, sleep modes, standby modes, etc.). The power saving mode can allow local storage module 34 to spin down disk drives and/or turn off certain other subsystems. In a particular embodiment, local conditions at local storage module 34 can be evaluated and, if local storage module 34 remains idle for an amount of time, local storage module 34 may request network storage module 26 to buffer the configurable amount of data so local storage module 34 can enter into a power savings mode.

By buffering the configurable amount of data at network storage module 26, local storage module 34 can enter into a power savings mode at off-peak times. Any rewind requests made at local storage module 34 can be fulfilled network storage module 26. When system-wide conditions merit that local storage module 34 should come back on-line (i.e., return to a normal operating mode), the configurable amount of data can be stored (or buffered) at local storage module 34 instead of at network storage module 26.

More specific to a traditional DVR set up, the DVR is unable to anticipate if a user would want to rewind a current channel at any given time. As a result, the DVR stores 30 minutes of data (buffers 30 minutes of a currently tuned channel) on the DVR's disk drive. This requires the local DVR to be systematically active: consuming energy and shortening the life of the disk drives. Energy management system 10 is configured to determine if there are sufficient network DVR resources (optionally in combination with observed local behavior) to satisfy a rewind request. If there are sufficient network resources to store or buffer the data at the network DVR, then (when appropriate) the local DVR enters into a sleep mode (or power saving mode) such that less energy is consumed. During such times, the DVR disk drives can be spun down. Hence, the DVR may be more energy efficient and the life of the disk drives in the DVR may be extended.

In operation, energy management system 10 can offer precise command and control for energy consumption associated with endpoints 18. The activities of energy management system 10 may (in certain instances) include broadcasting messages to individual endpoints 18 to shift from one power source to a different power source (e.g., during peak demand time intervals) or to enter into a power saving mode, as further discussed below. From a business perspective, the smart loading capabilities of the architecture allow for a realizable and significant cost savings. Furthermore, energy management system 10 provides a mechanism that understands the power consumption characteristics of endpoints 18 for which it has responsibility.

In operation, energy management system 10 can be configured to communicate a broadcast message that requests network devices to shift into a power saving mode. This broadcast message can be triggered in cases of excess power demand, based on specific policies, based on administrator preferences, based on cost considerations, etc. Consider an example where local storage module 34 has been turned off. Because local storage module 34 may remain active, even when turned off, network storage module 26 may be configured to determine if there are sufficient network resources (optionally in combination with observed local behavior) to put local storage module 34 into a power saving mode so less energy is consumed and the disk drives are spun down. In another example, local storage module 34 can be switched to battery power during peak usage times. Note that the term 'resources' is a broad term meant to encompass things such as bandwidth, CPU capacity, link availability, memory space, or any other suitable resource associated with data management.

The specific broadcast message could be formatted in any appropriate manner, provisioned as part of a standard (e.g., IETF Energy Management Standard), offered as a proprietary signaling mechanism, provisioned as part of existing signaling (e.g., discovery protocols, heartbeat messaging, keep alive messaging, type-length-value (TLV) paradigms, etc.), provisioned internally in the actual endpoints 18, which could reference a policy instructing them to switch power sources at certain times, enter into a power saving mode, etc. Any message format could be used to accommodate the energy management activities being discussed herein. This includes directing networked devices to shift energy resources in a particular fashion and/or for a particular time interval. Note that the term 'switch' as used herein in this Specification is broad in that it includes any type of decoupling, disconnection, interruption, withdrawal, release, suspension, detachment, or any other suitable disengagement from a first power source to a second power source or entering into a power saving mode. The individual power sources are not necessarily equivalent, but certainly could be. The particular power sources can include power bricks, batteries (external or internal), DC sources, AC sources, power outlets, generators, solar panels, or any other suitable power source, which may be based on particular needs or specific energy configurations.

In particular scenarios, the given network device (e.g., local storage module 34) can choose to ignore the broadcast message. Such conditions are dynamic and, therefore, energy management system 10 is configured to be responsive to existing environmental constraints. Additionally, it should be noted that although the examples detailed herein may involve storage devices, the broadcast messaging mechanism is valid for any networked device that is able to switch to a different power source or to enter into a power saving mode. In addition, such systems can also have different levels of power saving modes, where different components of the system are turned off or powered down to conserve power.

Logistically, a parent-child relationship can exist between the network infrastructure (e.g., a router, a switch, etc.) and its associated endpoints. Broadcast messages can be exchanged between these components at appropriate times. Any suitable management application can collect energy usage parameters (e.g., across an entire domain for which it is responsible) and, subsequently, determine the power shedding/power source switching that should occur.

Controller 20 can send out broadcast messages to endpoints 18, to selected endpoints, to selected groups of endpoints, etc. in order to instruct them that they should enter into a power saving mode (to any appropriate degree), and/or switch power sources. In one particular example, the endpoints are adapted to interpret the broadcast messages (or to interpret an internal policy) such that the endpoints can readily switch to battery usage or enter into a power saving mode (e.g., based on available bandwidth capacity at the network level, during a peak demand window, etc.). In certain implementations, the broadcast messages received by the endpoints would include an assigned time interval for the endpoints to remain on battery power or in a power saving mode.

Additional instructions can indicate particular modes for transitioning between power sources or power saving modes (e.g., transitioning to a sleep mode after disconnecting from the battery source, transitioning to a power down mode after disconnecting from the battery source, transitioning to normal operations associated with a power outlet, etc.). Note that even if the endpoints cannot necessarily accommodate a full time interval for particular mode, the endpoints can still disconnect from their current power source or enter into a power saving mode for as long as would be practical. In this sense, a broadcast message can be viewed as a suggestion in certain scenarios, and not necessarily as a strict requirement for the endpoints to follow.

The management application can alert designated endpoints to shed power or enter into a power saving mode using various communication protocols. In one example, a simple broadcast message can be used to deliver this alert over the wired network. In other instances, a wireless access point can deliver this alert wirelessly via management frames in a corresponding 802.11 message. Note that in particular use cases, the Energy Efficient Ethernet protocol (e.g., IEEE 802.3az) can be involved in such messaging. Other protocols can include proprietary mechanisms, unicasting activities, multicasting activities, simple TCP/IP communications, user datagram protocol (UDP) communications, any appropriate discovery protocol, etc.

An agent or module provisioned in endpoints 18 can interpret the broadcast message in order to switch power sources or enter into a power saving mode. In some cases, where enhanced intelligence is provided in a power source, the power source itself could actively be involved in this transitioning scenario because there can be a continued power draw (often referred to as a 'vampire draw') in many instances. In yet other scenarios, a personal computer could actively participate in these activities by implementing a mechanism (e.g., provisioning software, providing instructions, etc.) for the power supply, which can be configured to disconnect itself from a power source or enter into a power saving mode.

Operationally, endpoints 18 can return to a charging power outlet or to a normal operating mode based on any number of potential options. For example, one option may be associated with a timeout message provided in the broadcast message. The message would indicate, for example, to enter into a power saving mode for the next two hours. Another option would involve a second broadcast message sent to instruct the endpoint to reconnect to the grid or return to a normal operating mode. Another option would involve a timeout message based on a given power level (e.g., disconnect the endpoint until it reaches a 20% battery life). Other options can be based on the endpoint itself, where a local policy is used to instruct the endpoint when to reconnect to a power outlet or return to a normal operating mode. Still other options can involve default-timing mechanisms (specific to each endpoint 18) such that endpoints 18 would automatically shift to their normal operating mode after some predefined time interval (e.g., 20 minutes, 30 minutes, 60 minutes, etc.).

A number of advantages can be achieved by the architecture of energy management system 10. For example, the architecture is configured to intelligently control power from a network perspective. More specifically, the architecture is configured to determine when local storage module 34 does not need to buffer a configurable amount of data and subsequently put local storage module 34 into a power saving mode so less energy is consumed and the disk drives may be spun down. Additionally, there is an additional benefit to charging/discharging endpoints in the manner outlined herein, as such activities can suitably maintain a healthy device life.

In addition, the architecture of energy management system 10 allows network and network-attached equipment to take advantage of a configuration that includes no central processing and no central repository. Such a configuration also offers the advantage of having no single point of failure. The group in a cloud (i.e., the network) can be self-managed, where no central control exists. Controller 20 can be representative of a single computing device, which could be provisioned anywhere in the network, or a plurality of controllers 20 can be provisioned at strategic locations in the network, as further described below.

Further, the configuration of energy management system 10 is protocol agnostic, where virtually any communication transport can be used. The system allows cloud computing to be done to a variable number of entities (all of which may have different types of ASICS, OSs, etc.). Dynamically, endpoints 18 can join and leave the heterogeneous environment, where various types of endpoints can be readily managed by energy management system 10. As a stand-alone solution, energy management system 10 enables businesses and residences to monitor and to control the electric consumption of networking equipment. An administrator can monitor devices like switches and routers, as well as LAN switch connected Power over Ethernet (PoE) devices such as phones, access points, IP security cameras, door access equipment, etc. Energy management system 10 also has the ability to monitor and to control the energy demands of AC powered devices such as smart power distribution units, networked building systems, office equipment, etc. Energy management system 10 also includes an open interface to allow 3rd party management systems to participate in the framework.

Figure 2A:
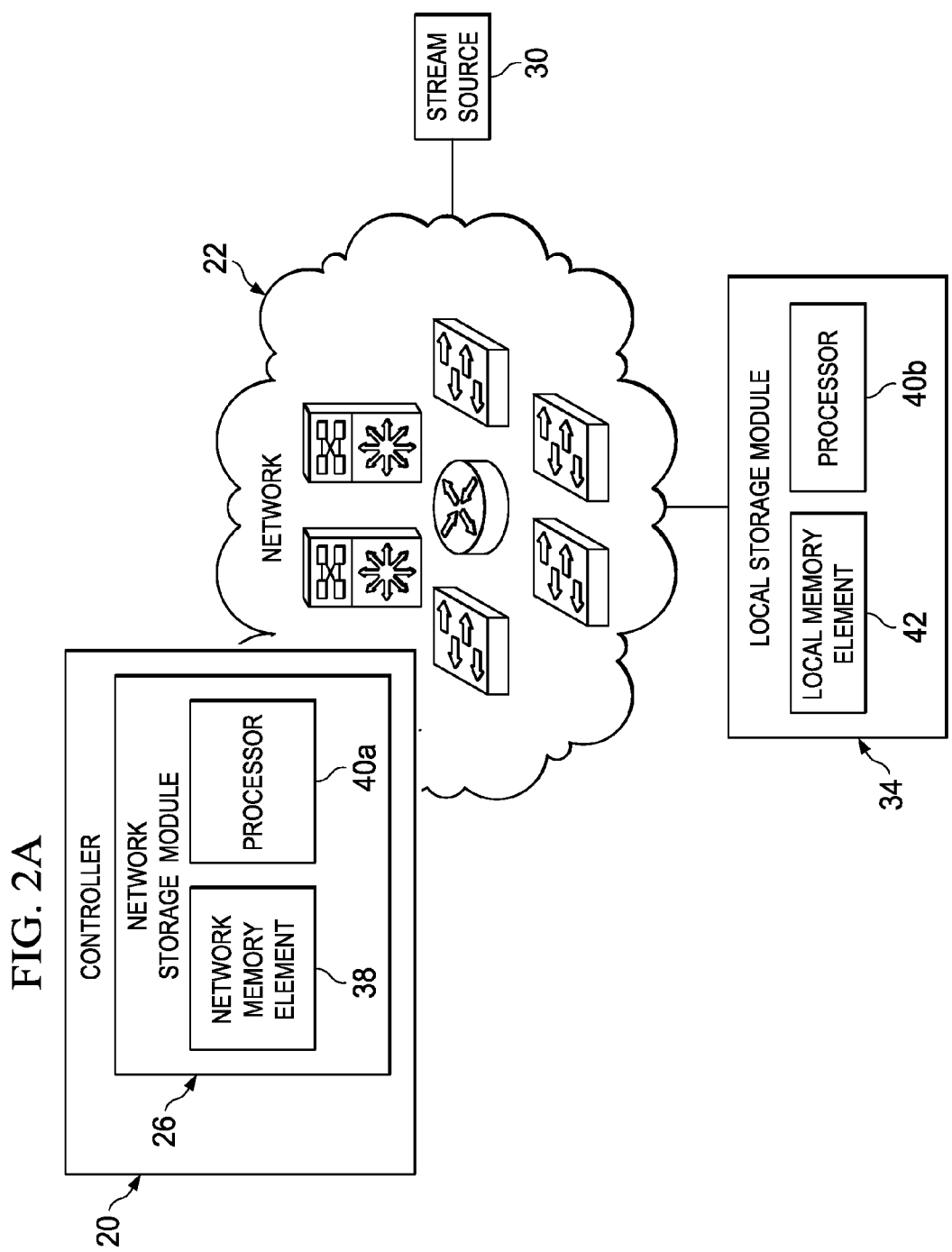
FIG. 2A is a simplified block diagram illustrating possible example details associated with one embodiment of the present disclosure.

Turning to FIG. 2A, FIG. 2A is a simplified block diagram illustrating one possible set of details associated with energy management system 10. FIG. 2A includes controller 20, network 22, network storage module 26, stream source 30, and local storage module 34. Network storage module 26 includes a network memory element 38 and a processor 40a. Local storage module 34 includes a local memory element 42 and a processor 40b. In a particular embodiment, local storage module 34 is a DVR. In this example, regardless of whether local storage module 34 is turned on, it stores a configurable amount of data (e.g., 30 minutes of content) from a currently tuned channel so that a user can rewind and watch the stored data if desired. This does not allow local storage module 34 to go into power saving modes, and shortens the life of the disk drives in local memory element 42.

In a particular embodiment, network storage module 26 determines if it has enough capacity to store the configurable amount of data and satisfy future rewind requests at local storage module 34. If network storage module 26 determines that there is enough spare bandwidth/CPU/disk capacity to satisfy future rewind requests, network storage module 26 sends a signal to local storage module 34 to not record the configurable amount of data, thus allowing local storage module 34 to enter into a power saving mode and possibly spin down the disk and/or turn off certain other subsystems.

By storing the configurable amount of data at network storage module 26, local memory element 42 (of local storage module 34) may be spun down at off-peak times when there is sufficient capacity to satisfy rewind requests from network storage module 26. When system-wide conditions merit that local storage module 34 returns to a normal operating mode, the configurable amount of data will be buffered in local memory element 42 instead of network storage module 26.

In a particular embodiment, local storage module 34 takes into consideration local conditions such that local storage module 34 may request network storage module 26 to buffer the configurable amount of data and local storage module 34 can enter a power savings mode. For example, local storage module 34 (or network storage module 26) may determine that local conditions indicate that local storage module 34 may be a candidate for entering a power saving mode. Two purposes of entering into the power saving mode include reducing power usage and extending the life of rotating media.

Local conditions that can indicate local storage module 34 would be a candidate for entering into a power saving mode can include no user input for a configured duration (e.g., 30 minutes, 45 minutes, 1 hour, etc.), or local storage module 34 being "turned off" (note that local memory element 42 is typically still active when local storage module 34 is "off"). Other conditions may include the use of presence systems (e.g., radio-frequency identification (RFID), cell phone usage, home automation and cloud notifications) to indicate that no users are around local storage module 34, or that the users are not home or in the same building as local storage module 34. In addition, historical data may be examined to see if a user or users have behaviors or patterns that indicate a rewind activity is likely. Certain indicators can include local storage module 34 usage at particular times of the day/week, previous activity that resulted in network storage module 26 rewind events, numerous unpredictable/unexpected rewind requests, etc. For example, a user may frequently rewind during a sporting event. Further, the availability of non-rotation storage in local storage module 34 may be evaluated: even if a lower resolution would be ultimately stored.

In an embodiment, after local storage module 34 takes into consideration local conditions, local storage module 34 may signal network storage module 26 that local storage module 34 would like to hand off the storage (i.e., perform buffering) of the configurable amount of data to network storage module 26. Network storage module 26 receives the request and analyzes current network conditions to see if capacity is available to satisfy upcoming rewind events. For example, network storage module 26 may determine if the data is already being recorded at network storage module 26 and, therefore, network storage module 26 can satisfy a request for the data (e.g., a request to rewind the channel content). If the data is not already being recorded at network storage module 26, network storage module 26 can determine if there is capacity in network memory element 38 to store (or buffer) the configurable amount of data. For example, network storage module 26 may determine if there is enough network capacity to unicast every request for data (e.g., rewind request) from local storage module 34 or if there is sufficient network resources to unicast an expected load based on the local conditions of local storage module 34. If the configurable amount of data (e.g., channel) is already being recorded and local storage module 34 requests the buffered data, the requested data may be available because network storage module 26 may be able to multicast the data to each local storage module 34 requesting the data.

For hybrid fibre-coaxial (HFC) networks, network storage module 26 may be configured to correlate the availability of quadrature amplitude modulation (QAM) channels to local storage module 34. There may be a hierarchy of QAM mapping to service groups (different local storage module 34), so knowledge of the network topology may be required. For data over cable service interface specification (DOCSIS) systems, network storage module 26 may be configured to correlate the available cable modem termination system (CMTS) bandwidth to bandwidth associated with local storage module 34. There may be a hierarchy of QAM bonding groups, so knowledge of the network topology may be involved.

In a particular embodiment, network storage module 26 and/or local storage module 34 tracks user activity over time. By tracking user activity, local storage module 34 may identify different behaviors during prime time, off-peak, and morning hours. For example, network storage module 26 and/or local storage module 34 may be configured with an adaptive scheme that learns the times at which local storage module 34 expects load. Part of this learning may include the anticipation of events with high live viewership (e.g., the National Football League (NFL) Super Bowl), or pay-per-view programs that have been purchased.

Network storage module 26 may track the likelihood that a particular local storage module 34 will trigger rewind activity from network storage module 26 by analyzing past rewind activity. In one embodiment, local storage module 34 may elect to spin down disk drives and buffer the configurable amount of data in a lower resolution format to memory/non-volatile random-access memory (NVRAM) located in local storage module 34. Local storage module 34 may also elect to enter subsystems into a power saving mode or spin down other subsystems (e.g., local transcoders or other assets). Network storage module 26 can periodically update local storage module 34 with the likelihood of being able to buffer the configurable amount of data, and local storage module 34 may periodically decide to enter resources into a power saving mode.

When a user attempts to access local storage module 34 in cases where local storage module 34 has been place in a power saving mode, the live data at a current position (the data that stream source 30 is currently communicating and local storage module 34 is currently receiving) is buffered at local memory element 42 so that the data is locally stored on local storage module 34. If the user wants to rewind and local storage module 34 does not have the user requested data locally buffered or cached, (i.e., because the data has been buffered at network storage module 26), the requested data is obtained from network storage module 26. In one embodiment, the entire buffered data is cached locally on local storage module 34 and then presented (displayed) to the user. In another embodiment, the buffered data is streamed (either unicast or multicast) to the user until local storage module 34 can present the desired playout position.

Figure 2B:
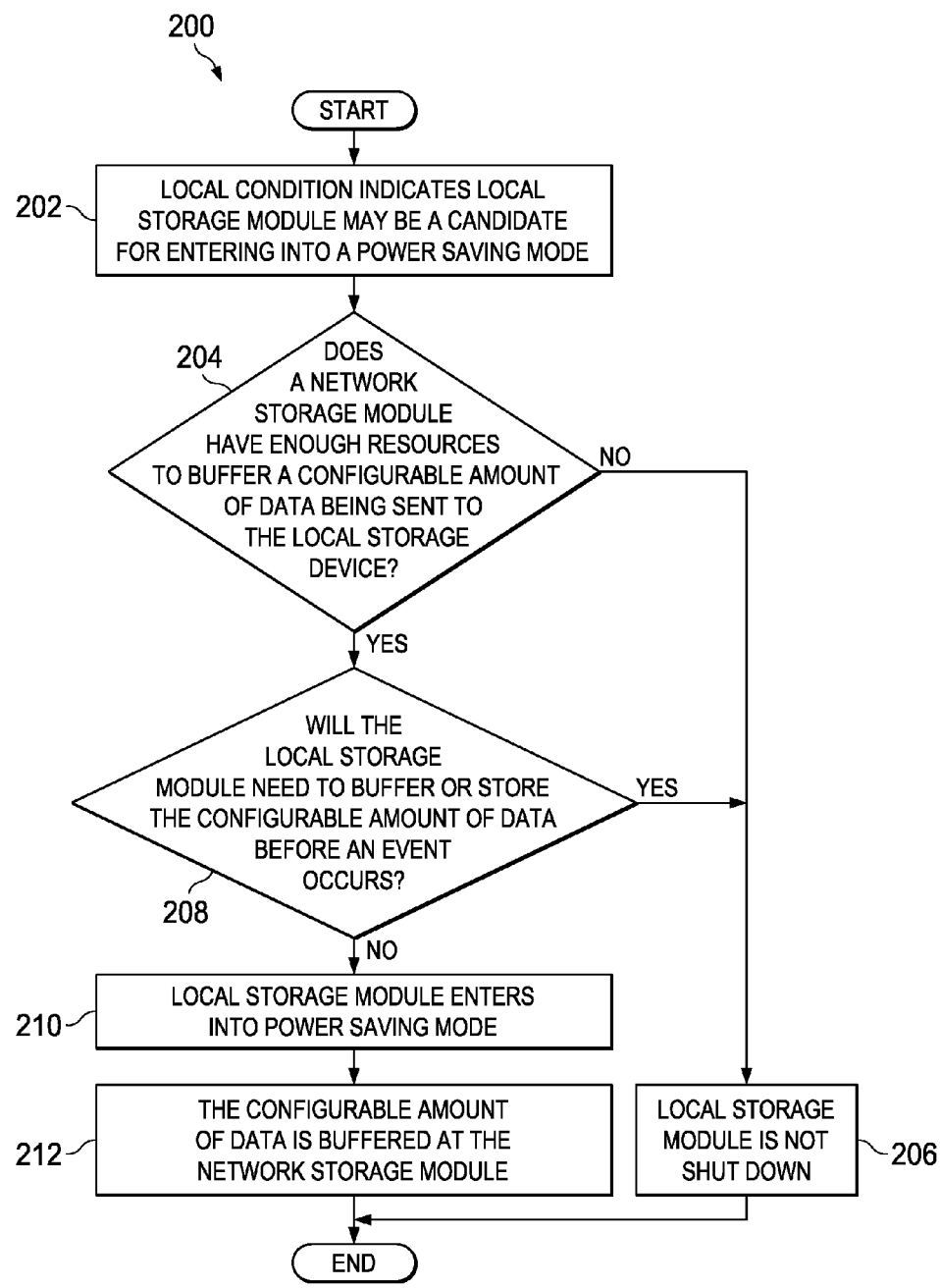
FIG. 2B is a simplified flow diagram illustrating potential operations associated with one embodiment of the present disclosure.

Turning to FIG. 2B, FIG. 2B is a simplified flowchart 200 illustrating example activities of local storage module 34 entering into a power saving mode. At 202, local conditions indicate that a local storage module may be a candidate for entering into a power saving mode. For example, the local conditions may be monitored by local storage module 34, network storage module 26, or both. At 204, the system can determine if a network storage module has enough resources to buffer a configurable amount of data that is being sent to the local storage module. If the network storage module does not have enough resources, then the local storage module is not shut down, as in 206.

If the network storage module does have enough resources, then the system determines if the local storage module will need to buffer or store the configurable amount of data before an event occurs, as in 208. If the local storage module will need to buffer or store the configurable amount of data before an event occurs, then the local storage module is not shut down, as in 206. If the local storage module will not need to buffer or store the configurable amount of data before an event occurs, then the local storage module enters into a power saving mode, as in 210. At 212, the configurable amount of data is buffered at the network storage module.

Figure 2C:
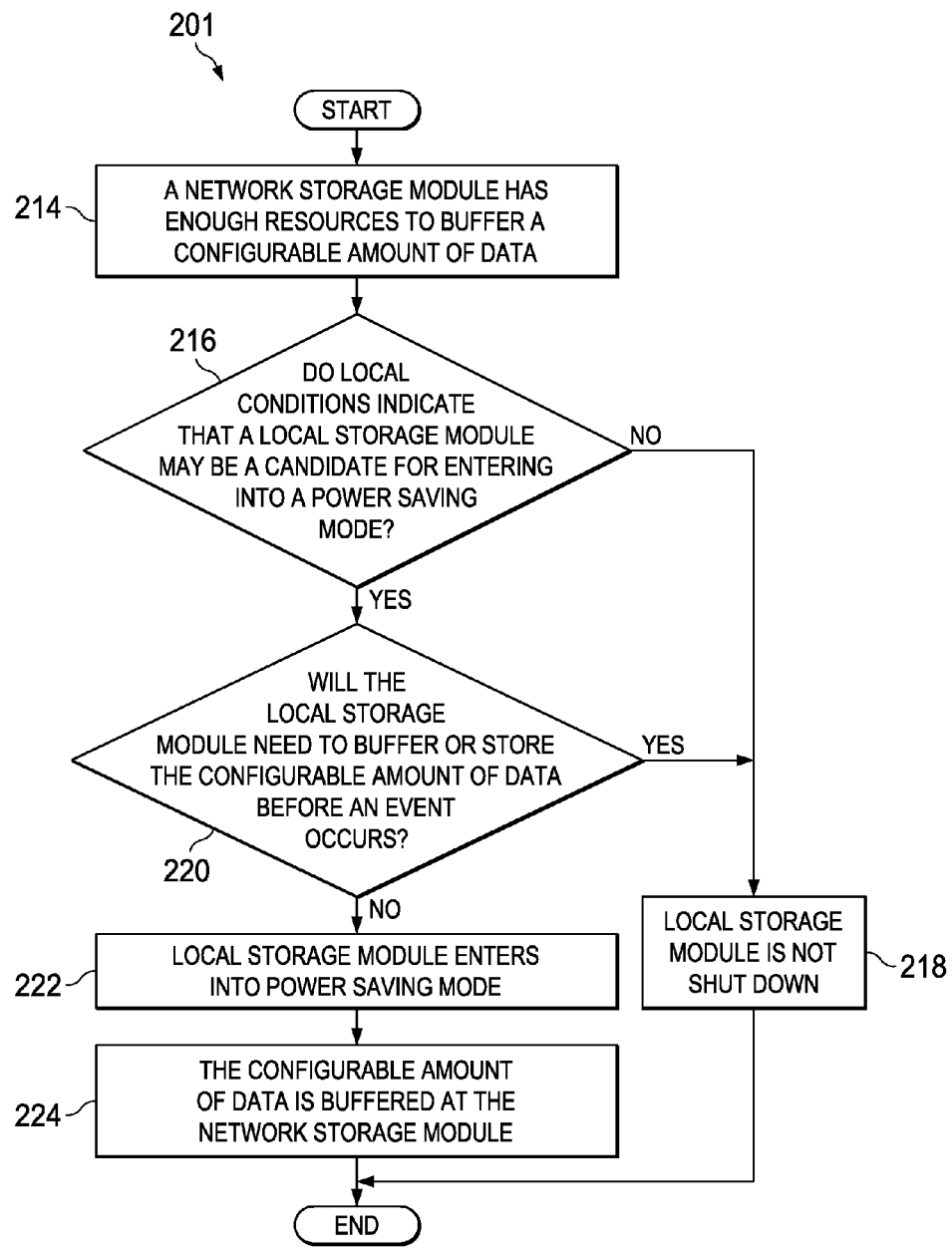
FIG. 2C is a simplified flow diagram illustrating potential operations associated with one embodiment of the present disclosure.

Turning to FIG. 2C, FIG. 2C is a simplified flowchart 201 illustrating example activities of local storage module 34 entering into a power saving mode. At 214, a given network storage module has enough resources to buffer a configurable amount of data. At 216, the system determines if local conditions indicate that a local storage module may be a candidate for entering into a power saving mode. If the local storage module is not a candidate for entering into a power saving mode, then the local storage module is not shut down, as in 218.

If the local storage module is a candidate for entering into a power saving mode, then the system determines if the local storage module will need to buffer or store the configurable amount of data before an event occurs, as in 220. If the local storage module will need to buffer or store the configurable amount of data before an event occurs, then the local storage module is not shut down, as in 218. If the local storage module will not need to buffer or store the configurable amount of data before an event occurs, then the local storage module enters into a power saving mode, as in 222. At 224, the configurable amount of data is buffered at the network storage module.

Figure 2D:
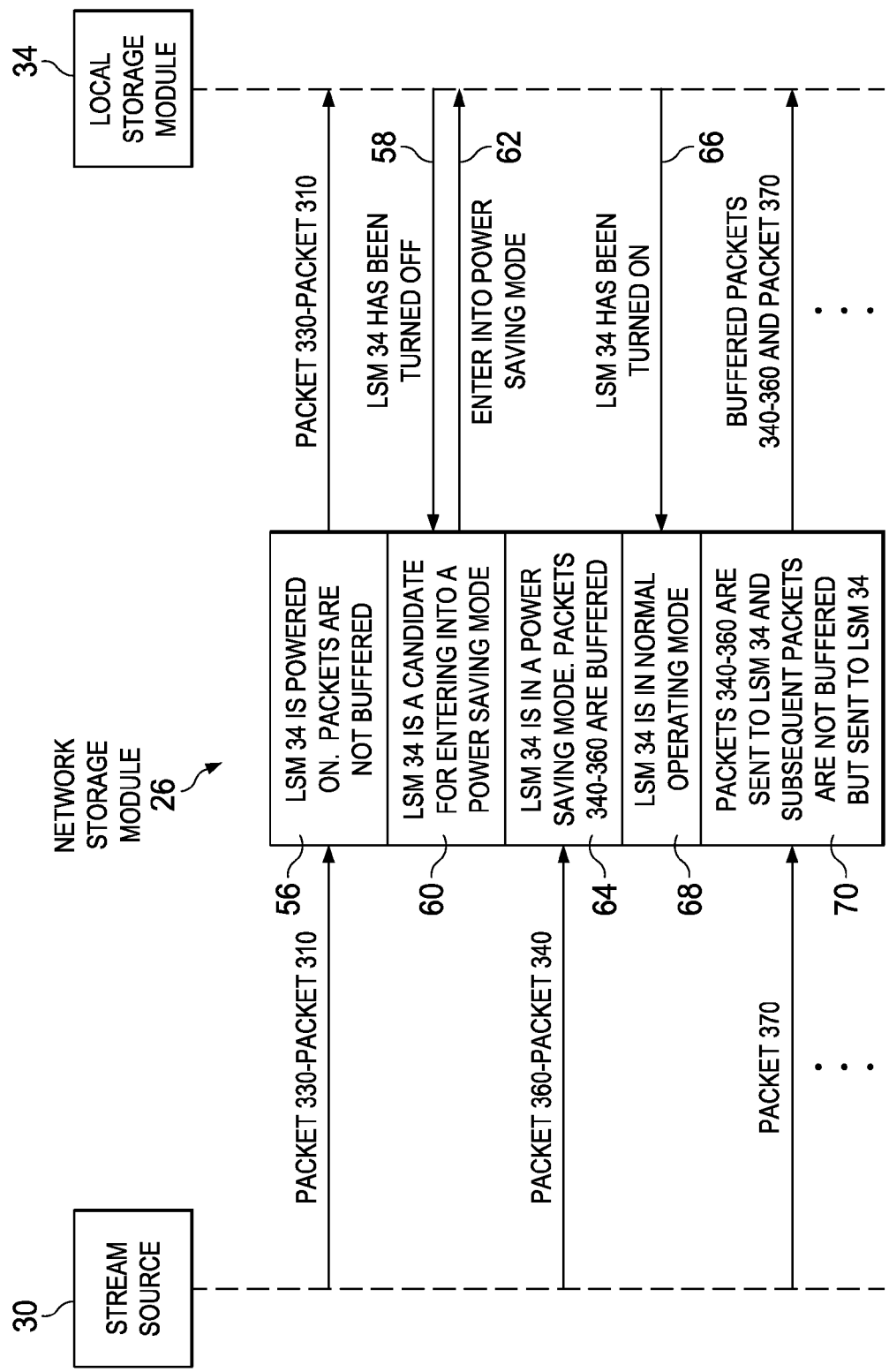
FIG. 2D is a simplified flow diagram illustrating potential operations associated with one embodiment of the present disclosure.

Turning to FIG. 2D, FIG. 2D is a message flow diagram of a portion of energy management system 10, showing more detail of the component interactions in the example scenario of FIG. 2A. In this particular implementation, FIG. 2D includes stream source 30, network storage module 26, and local storage module 34. As shown by an indicator 56, local storage module 34 is powered on, packets are not buffered at network storage module 26, and stream source 30 transmits packets 310-330 through network storage module 26 to local storage module 34. In this example, after packet 330 is received, local storage module 34 sends network storage module 26 a signal 58 that indicates local storage module 34 has been turned off. Network storage module 26 may interpret signal 58 that local storage module is a candidate for entering into a power saving mode, as shown by an indicator 60.

In response to signal 58, and if network storage module 26 has enough resources to buffer a configurable amount of data, network storage module 26 sends a signal 62 to local storage module 34 to enter into a power saving mode. While local storage module 34 is in a power saving mode, packets 340-360 are buffered at network storage module 26. After a period of time, local storage module 34 sends network storage module 26 a signal 66 that local storage module 34 has been turned on and is in normal operating mode, as shown by an indicator 68. Network storage module 26 sends packets 340-360 that network storage module 26 has buffered and does not buffer any more packets. In a particular embodiment, network storage module 26 only sends packets 340-360 if they are requested (i.e., a rewind request by the user). Stream source 30 transmits packet 370 and any further packets through network storage module 26 (and to local storage module 34), until local storage module 34 again enters into a power saving mode.

Figure 3:
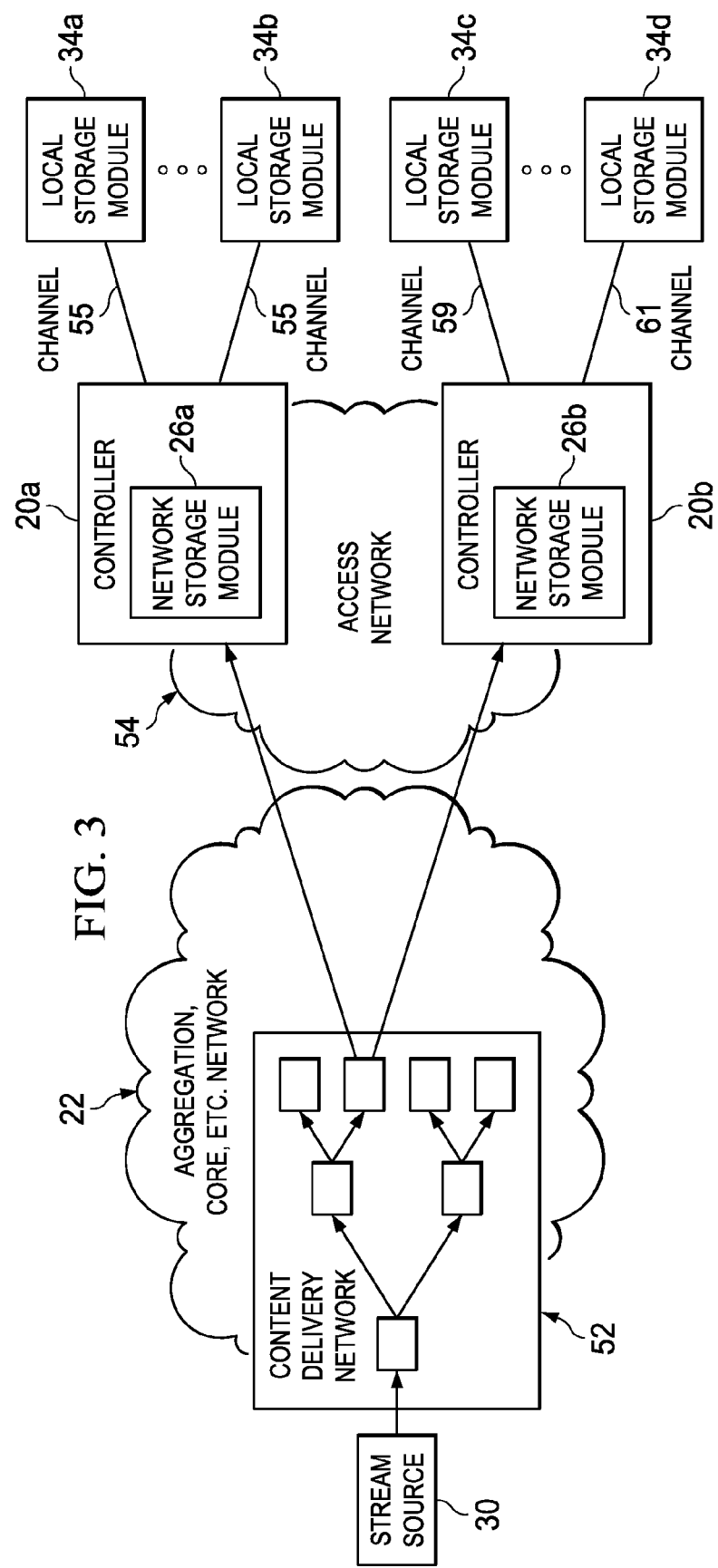
FIG. 3 is a simplified block diagram illustrating possible example details associated with one embodiment of the present disclosure.

FIG. 3 is a simplified block diagram illustrating one embodiment of energy management system 10. FIG. 3 includes stream source 30, network 22, controllers 20a and 20b, network control modules 26a and 26b, local storage modules 34a-d, a content delivery network 52, and an access network 54. Content delivery network 52 is a system of computers or servers containing copies of data placed at various nodes of network 22. The nodes are usually deployed in multiple locations (often over multiple backbones) and, further, can cooperate with each other to satisfy requests for content by end users (e.g., users of local storage modules 34a-d). The number of nodes and servers making up content delivery network 52 varies depending on the architecture. Requests for content are (typically) algorithmically directed to nodes that are optimal in some way. When optimizing for performance, locations that are best for serving content to the end users may be chosen. This may be measured by choosing locations that have the fewest hops, the fewest number of network seconds away from the requesting end users, or the highest availability in terms of server performance (both current and historical), so as to optimize delivery across local networks.

Access network 54 simply refers to the series of wires, cables and equipment lying between a consumer/business termination point (the point at which a connection reaches the end users) and the local exchange. The local exchange contains banks of automated switching equipment to direct a connection to the end users. The access network may be constantly evolving, growing as new end users are connected, and as new services are offered.

When a configurable amount of data (e.g., on a channel 55) is buffered at network storage module 26a and requested by local storage module 34a and 34b, network storage module 26a (or controller 20a) may multicast channel 56 to local storage modules 34a and 34b. If network storage module 26a can multicast channel 56 to local storage modules 34a and 34b, then network capacity can be increased and used to buffer a different channel. In addition, network storage module 26b may buffer a first configurable amount of data (e.g., on a channel 59) and a second configurable amount of data (e.g., on a channel 61). Network storage module 26b (or controller 20b) can be configured to deliver channel 59 to local storage module 34c and channel 61 to local storage module 34d.

Controllers 20a and 20b and/or network storage modules 26a and 26b can maintain any number of data sets (e.g., tables, lists, policies, etc.) that can be used in the management of the architecture. For example, the data can reveal a given endpoint's local storage module's 34a-d, identification or ID, the endpoint's role, the domain of the endpoint, the importance of the endpoint, the current energy levels of the endpoints, the battery capabilities of the endpoints (e.g., their ability to shift to a battery source), the current battery levels of the endpoints (e.g., including a low battery level threshold, which can be reflective of vulnerabilities for data loss), a respective management interface for the endpoints, any respective children of the endpoints, any possible neighbors of the endpoints, the possible power saving modes of the endpoints, etc. Controllers 20a and 20b and/or network storage modules 26a and 26b can use the data sets to control multiple endpoints.

In one example implementation, each local storage module 34a-d and/or controllers 20a and 20b can include software to achieve the optimal energy management operations, as outlined herein in this Specification. For example, controllers 20a and 20b may include software (e.g., in network storage modules 26a and 26b respectively), which is configured to intelligently evaluate an opportune time for sending broadcast messages to local storage modules 34a-d (for switching between power sources or power saving modes). In example embodiments, simple network access can be leveraged to offer the capability for an end user to control energy parameters in a given domain.

Controllers 20a and 20b are network elements configured to interact with local storage modules 34a-d in order to manage energy usage in energy management system 10. Note that controllers 20a and 20b can readily be part of a server in certain embodiments of this architecture, or provisioned in conjunction with management applications 12. As used herein in this Specification, the term 'network element' is meant to encompass proprietary devices, servers, network appliances, routers, switches, management appliances, gateways, bridges, loadbalancers, firewalls, processors, modules, or any other suitable device, node, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Software for providing intelligent energy management functionalities can be provided at various locations. In one example implementation, this software is resident in a network element (e.g., provisioned in controllers 20a and 20b, network storage modules 26a and 26b, local storage modules 34a-d, and/or any of endpoints 18) or in another network element for which this capability is relegated. In other examples, this could involve combining domain devices, controllers 20a and 20b, network storage modules 26a and 26b, local storage modules 34a-d, and/or other endpoints 18 with an application server, a firewall, a gateway, or some proprietary element, which could be provided in (or be proximate to) these identified network elements, or this could be provided in any other device being used in a given network. In other embodiments, each controller 20a and 20b, network storage module 26a and 26b, local storage module 34a-d, and/or endpoint 18 may include any suitable algorithms, hardware, software, components, modules, interfaces, or objects that facilitate these energy management operations. This may be inclusive of appropriate communication protocols that allow for the effective exchange of data or information for achieving energy management in a network environment.

In still other embodiments, the energy management features may be provided externally to controllers 20a and 20b, network storage modules 26a and 26b, local storage modules 34a-d, and/or endpoints 18, or included in some other network device, or in a computer to achieve these intended functionalities. As identified previously, a network element can include software to achieve the energy management operations, as outlined herein in this Specification. In certain example implementations, the energy management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [e.g., network memory element 38 and local memory element 42 in FIG. 2A] can store data used for the operations described herein. This includes the memory element being able to store instructions (e.g., software, logic, code, etc.) that are executed to carry out the activities described in this Specification. A processor can execute any type of instructions associated with the data to achieve the operations detailed herein in this Specification. In one example, the processor [e.g., processor 40a and 40b in FIG. 2A] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, the endpoints, etc.) can include memory elements for storing information to be used in achieving the energy management activities as outlined herein. Additionally, each of these devices may include a processor that can execute software or an algorithm to perform the energy management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Turning to FIG. 4, FIG. 4 is a simplified flowchart 400 illustrating one potential operation associated with the present disclosure. At 402, local conditions indicate that a local storage module may be a candidate for entering into a power saving mode. The local conditions may be monitored by local storage module 34, network storage module 26, or both. At 404, the system determines if a network storage module has enough resources to buffer a configurable amount of data that is currently being sent to the local storage module. If the network storage module does not have enough resources, then the local storage module is not shut down, as in 406.

If the network storage module does have enough resources, then the system determines if the local storage module will need to buffer or store the configurable amount of data before an event occurs, as is illustrated in 408. If the local storage module will need to buffer or store the configurable amount of data before an event occurs, then the local storage module is not shut down, as in 406. If the local storage module will not need to buffer or store the configurable amount of data before an event occurs, then the local storage module's memory is shut down and the local storage module is powered off, as in 410. At 412, the configurable amount of data is buffered at the network storage module.

At 414, the system determines if the local storage module has returned to a normal operating mode. If the local storage module has not returned to a normal operating mode, then the configurable amount of data continues to be buffered at the network storage module, as in 412. If the local storage module has returned to a normal operating mode, then the buffered data is sent to the local storage module, as illustrated in 416. In a particular embodiment, the buffered data is only sent to the local storage module if a request is received for the buffered or stored data. At 418, the configurable amount of data is not buffered at the network storage module.

Logistically, certain items or elements can be provisioned for the intelligent energy management system to function. For example, the enabled endpoints of FIG. 1 can include an agent (for example, in software) that allows these endpoints to respond to messages from the network. Note that the term 'message' as used herein in this Specification is meant to encompass any type of signaling, packet information, broadcasting, short message service (SMS) communications, instant messaging (IM), e-mail protocols, or any other message type that can be delivered to an endpoint such that it understands to switch between available power sources.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that energy management system 10 (and its teachings) are readily scalable and, further, can accommodate a large number of components, as well as more complicated/sophisticated arrangements and configurations. Accordingly, the examples provided should not limit the scope or inhibit the broad teachings of energy management system 10, as potentially applied to a myriad of other architectures.

It is also important to note that the steps in the preceding FIGURES illustrate only some of the possible scenarios that may be executed by, or within, energy management system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by energy management system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols (e.g., UDP, SSL, SNMP, etc.), energy management system 10 may be applicable to other exchanges and protocols in which data are exchanged in order to provide energy management operations. In addition, although energy management system 10 has been illustrated with reference to particular elements and operations that facilitate the communication process, these elements and operations may be replaced by any suitable architecture or process that achieves the intended functionality of energy management system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining that a network storage module has resources for buffering a configurable amount of data currently being sent to a local storage module, such that network storage module can satisfy a request for the configurable amount of data while the local storage module is in a power saving mode;
   determining if the local storage module should enter into the power saving mode; and
   buffering the configurable amount of data at the network storage module while the local storage module is in the power saving mode.

2. The method of claim 1, further comprising:
   communicating the configurable amount of data to the local storage module after it resumes a normal operating mode.

3. The method of claim 1, further comprising:
   communicating at least a portion of the configurable amount of data to the local storage module using a unicast protocol or a multicast protocol.

4. The method of claim 1, wherein the local storage module is provided in a digital video recorder, which resumes a normal operating mode after a predetermined time interval.

5. The method of claim 1, wherein historical data of past use of the local storage module is used to determine if the local storage module should enter into the power saving mode.

6. The method of claim 1, wherein a particular type of content is evaluated as a basis for determining whether to initiate the buffering of the configurable amount of data.

7. The method of claim 1, wherein at least a portion of the configurable amount of data is cached and presented at a requested playout position identified in a request for the portion.

8. Logic encoded in one or more non-transitory media that includes code for execution and when executed by a processor is operable to perform operations, comprising:
   determining that a network storage module has resources for buffering a configurable amount of data currently being sent to a local storage module, such that network storage module can satisfy a request for the configurable amount of data while the local storage module is in a power saving mode;
   determining if the local storage module should enter into the power saving mode; and
   buffering the configurable amount of data at the network storage module while the local storage module is in the power saving mode.

9. The logic of claim 8, the operations further comprising:
   communicating the configurable amount of data to the local storage module after it resumes a normal operating mode.

10. The logic of claim 8, the operations further comprising:
    communicating at least a portion of the configurable amount of data to the local storage module using a unicast protocol or a multicast protocol.

11. The logic of claim 8, wherein the local storage module is provided in a digital video recorder, which resumes a normal operating mode after a predetermined time interval.

12. The logic of claim 8, wherein historical data of past use of the local storage module is used to determine if the local storage module should enter into the power saving mode.

13. The logic of claim 8, wherein a particular type of content is evaluated as a basis for determining whether to initiate the buffering of the configurable amount of data.

14. The logic of claim 8, wherein at least a portion of the configurable amount of data is cached and presented at a requested playout position identified in a request for the portion.

15. An apparatus, comprising:
a memory element configured to store data;
a processor operable to execute instructions associated with the data;
a network storage module configured to interface with the memory element and the processor such that the apparatus is configured for:
determining that a network storage module has resources for buffering a configurable amount of data currently being sent to a local storage module, such that network storage module can satisfy a request for the configurable amount of data while the local storage module is in a power saving mode;
determining if the local storage module should enter into the power saving mode; and
buffering the configurable amount of data at the network storage module while the local storage module is in the power saving mode.

16. The apparatus of claim 15, the apparatus further configured for:
communicating the configurable amount of data to the local storage module after it resumes a normal operating mode.

17. The apparatus of claim 15, the apparatus being further configured for:
communicating at least a portion of the configurable amount of data to the local storage module using a unicast protocol or a multicast protocol.

18. The apparatus of claim 15, wherein historical data of past use of the local storage module is used to determine if the local storage module should enter into the power saving mode.

19. The apparatus of claim 15, wherein a particular type of content is evaluated as a basis for determining whether to initiate the buffering of the configurable amount of data.

20. The apparatus of claim 15, wherein at least a portion of the configurable amount of data is cached and presented at a requested playout position identified in a request for the portion.

* * * * *